US010172321B1

(12) United States Patent
Perez

(10) Patent No.: US 10,172,321 B1
(45) Date of Patent: Jan. 8, 2019

(54) PORTABLE PET RAMP

(71) Applicant: Amanda Perez, Visalia, CA (US)

(72) Inventor: Amanda Perez, Visalia, CA (US)

(*) Notice: Subject to any disclaimer, the term of this patent is extended or adjusted under 35 U.S.C. 154(b) by 0 days.

(21) Appl. No.: 15/620,954

(22) Filed: Jun. 13, 2017

(51) Int. Cl.
*A01K 1/035* (2006.01)
*E06B 7/32* (2006.01)
*A01K 1/03* (2006.01)

(52) U.S. Cl.
CPC ............... *A01K 1/035* (2013.01); *E06B 7/32* (2013.01); *A01K 1/033* (2013.01)

(58) Field of Classification Search
CPC ........ B65G 69/30; A01K 1/035; A01K 1/033; A01K 1/0035; B60P 1/43; B60P 3/04; B60P 1/431; B60P 1/433
USPC ................ 119/847, 849, 28.5, 484, 501, 706
See application file for complete search history.

(56) References Cited

U.S. PATENT DOCUMENTS

| 3,009,183 | A | | 11/1961 | Lay | |
|---|---|---|---|---|---|
| 3,173,398 | A | * | 3/1965 | Raymond | A01K 1/035 119/28.5 |
| 3,797,461 | A | * | 3/1974 | Breeden | A01K 1/033 119/28.5 |
| 3,891,053 | A | * | 6/1975 | Burton | B63B 27/14 114/362 |
| 3,984,891 | A | * | 10/1976 | Weinmann | B65G 69/30 14/69.5 |
| 4,224,899 | A | * | 9/1980 | Cruchelow | A01K 1/033 119/501 |
| 4,231,321 | A | * | 11/1980 | Cohen | A01K 1/0121 119/162 |
| 4,291,645 | A | * | 9/1981 | Cruchelow | A01K 1/033 119/484 |
| 4,498,418 | A | * | 2/1985 | Chumley | A01K 1/0035 105/372 |
| 4,566,404 | A | * | 1/1986 | Instone | A01K 1/0035 119/400 |
| 4,989,546 | A | * | 2/1991 | Cannaday | A01K 1/033 119/484 |
| 5,213,060 | A | * | 5/1993 | Sloan | A01K 1/0353 119/28.5 |
| 5,634,440 | A | * | 6/1997 | Mogck | A01K 1/035 119/706 |
| 5,870,788 | A | | 2/1999 | Witkin | |
| 5,933,898 | A | | 8/1999 | Estes | |
| 5,967,215 | A | | 10/1999 | Needham | |

(Continued)

FOREIGN PATENT DOCUMENTS

WO 9954242 A1 10/1999

*Primary Examiner* — Yvonne R Abbott-Lewis
(74) *Attorney, Agent, or Firm* — Kyle A. Fletcher, Esq.

(57) ABSTRACT

The portable pet ramp is configured for use with a pet access door. The portable pet ramp is an inclined structure that joins the horizontal plane that contains the threshold of the host door with the horizontal plane that contains the threshold of the pet access door. The portable pet ramp attaches the threshold of the pet access door to the horizontal surface that supports the threshold of the host door such that a pet may walk up the portable pet ramp to pass through the pet access door. The portable pet ramp is removably attached to the pet access door such that the host door may be further used for the ingress and egress of humans. The portable pet ramp comprises a plate, one or more brackets, and a slide stop. The one or more brackets and the slide stop attach to the plate.

15 Claims, 6 Drawing Sheets

(56) References Cited

U.S. PATENT DOCUMENTS

| | | | | |
|---|---|---|---|---|
| 6,119,634 A * | 9/2000 | Myrick | A01K 1/0272 | 119/847 |
| 6,185,775 B1 * | 2/2001 | McCarthy | B60P 1/43 | 14/69.5 |
| D440,717 S * | 4/2001 | Fazio | 119/706 | |
| 6,267,082 B1 * | 7/2001 | Naragon | A01K 1/035 | 119/849 |
| 6,463,613 B1 | 10/2002 | Thompson | | |
| 6,691,645 B1 | 2/2004 | Ayers, Jr. | | |
| 6,715,177 B1 * | 4/2004 | Lagergren-Julander | B60P 1/433 | 119/847 |
| 6,868,574 B2 * | 3/2005 | Schomaker | B65D 88/542 | 14/69.5 |
| 6,968,810 B2 * | 11/2005 | Bishop | A01K 1/035 | 119/847 |
| 6,983,720 B2 * | 1/2006 | Lakela | A01K 1/0107 | 119/161 |
| 7,207,141 B2 * | 4/2007 | Sullivan | E06B 7/32 | 119/481 |
| 7,493,874 B2 * | 2/2009 | Simpson | A01K 1/0272 | 119/849 |
| D596,812 S * | 7/2009 | Sicken | D30/199 | |
| 7,621,236 B2 * | 11/2009 | Steffey | E06C 1/387 | 119/847 |
| 7,640,890 B1 * | 1/2010 | Maynard | A01K 1/035 | 119/484 |
| 7,673,585 B1 * | 3/2010 | Emmi | A01K 1/0107 | 119/165 |
| 7,921,812 B1 * | 4/2011 | Carrillo | A01K 13/001 | 119/602 |
| 8,117,994 B1 * | 2/2012 | Goodlow | A01K 1/035 | 119/847 |
| 8,166,593 B1 * | 5/2012 | Trauernicht | B65G 69/30 | 119/847 |
| 8,302,348 B2 | 11/2012 | Noyes | | |
| 8,695,141 B1 * | 4/2014 | Villareal | B65G 69/30 | 14/69.5 |
| D729,462 S * | 5/2015 | Jakubowski | D30/199 | |
| D734,570 S * | 7/2015 | Hawk | D30/199 | |
| D756,573 S * | 5/2016 | Jakubowski | D30/199 | |
| D793,024 S * | 7/2017 | Bernart | D34/32 | |
| 9,694,997 B2 * | 7/2017 | Lopez | B65G 69/30 | |
| 2005/0050833 A1 * | 3/2005 | Spray | E06B 7/32 | 52/716.2 |
| 2006/0042558 A1 * | 3/2006 | Stephens | A01K 1/033 | 119/484 |
| 2006/0196439 A1 * | 9/2006 | Chilcoat | A01K 1/011 | 119/165 |
| 2006/0245883 A1 * | 11/2006 | Fontaine | A61G 3/061 | 414/537 |
| 2009/0038558 A1 * | 2/2009 | Schulte | A01K 1/0245 | 119/496 |

* cited by examiner

PORTABLE PET RAMP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building including doors, windows and shutters, more specifically, a special arrangement for a door.

A pet access door is an aperture that is configured for use within a door of a residential building. The pet access door is a portal through which an animal, hereinafter referred to as a pet, may enter and exit the residential building without the assistance of a human to open and close the door. Among the factors involved in the selection of a pet access door is the size of the pet that is expected to use the door. Specifically, the size of the pet determines: 1) the inner dimensions of the pet access door; and, 2) the vertical span between the threshold of the pet access door and the threshold of the door of the residential building that hosts the pet access door. The inner dimensions of the pet access door are selected such that the surface area presented by the pet access door is large enough to allow the pet to pass through the pet access door. Similarly, the vertical span is selected such that the selected pet to pass through the pet access door without having to stoop or jump through the pet access door.

One shortcoming of a pet access door is this specificity relative to a specific pet. Any new pets that come to inhabit the residential building will generally be of a different size than the originally selected pet. Because the host door is typically only capable of supporting a single pet access door this forces the new pet to adapt to the vertical span of the existing pet access door. Similarly, the originally selected pet can subsequently face medical issues, such as hip dysplasia, that can be aggravated by the vertical span of the existing pet access door.

Clearly, a method to compensate for the fixed vertical span of an existing pet access door would be of benefit to new pets and existing pets that face medical issues.

SUMMARY OF INVENTION

The portable pet ramp is configured for use with a pet access door. The portable pet ramp is configured for use with the host door associated with the pet access door. The portable pet ramp is an inclined structure that joins the horizontal plane that supports the threshold of the host door with the horizontal plane that contains the threshold of the pet access door. The portable pet ramp attaches the threshold of the pet access door to the horizontal surface that supports the threshold of the host door such that a pet may walk up the portable pet ramp to pass through the pet access door. The portable pet ramp is removably attached to the pet access door such that the host door may be further used for the ingress and egress of humans.

These together with additional objects, features and advantages of the portable pet ramp will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable pet ramp in detail, it is to be understood that the portable pet ramp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable pet ramp.

It is therefore important that the claims be regarded as including such equivalent construction insofar as they do not depart from the spirit and scope of the portable pet ramp. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
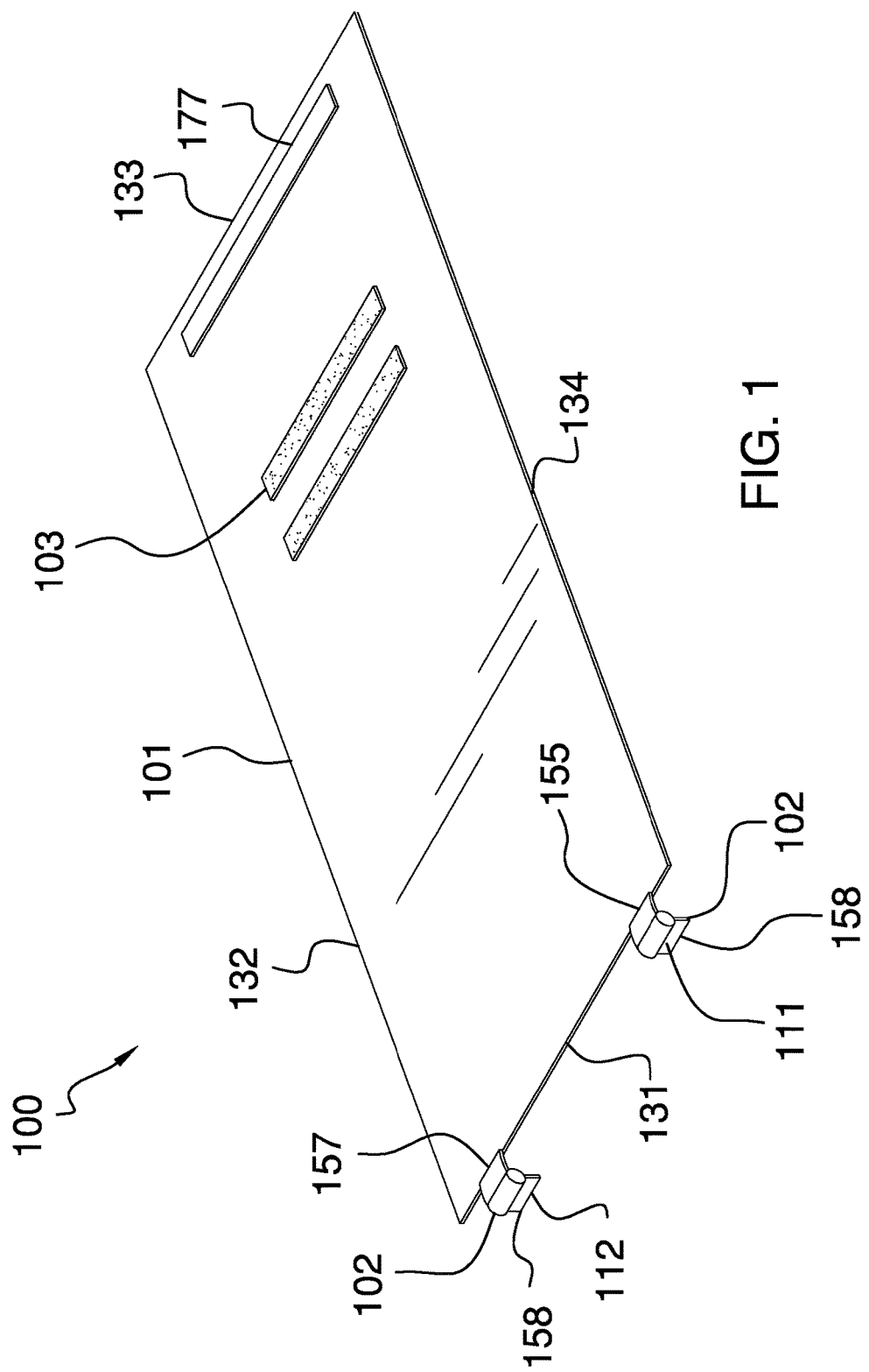
FIG. 1 is a perspective view of an embodiment of the disclosure.
Figure 2:
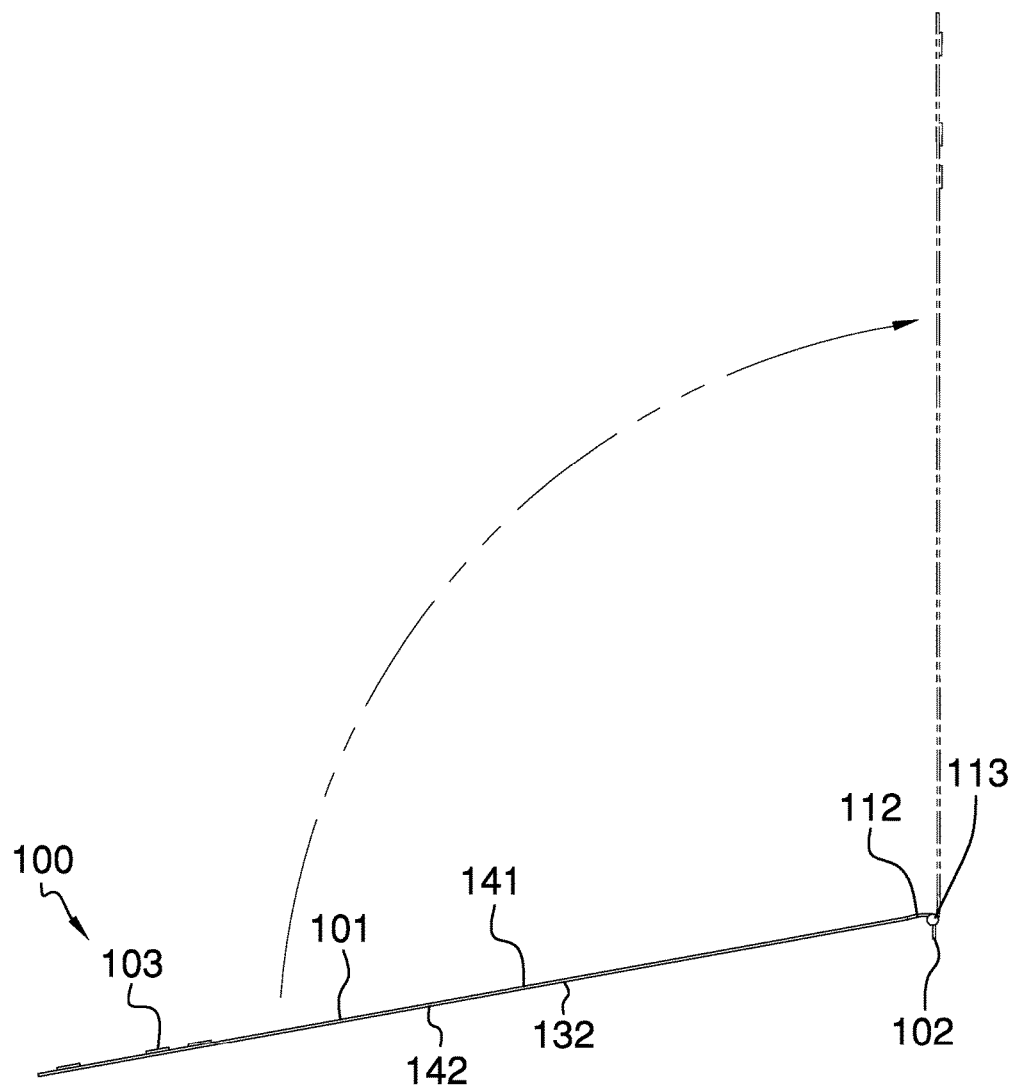
FIG. 2 is a side view of an embodiment of the disclosure.
Figure 3:
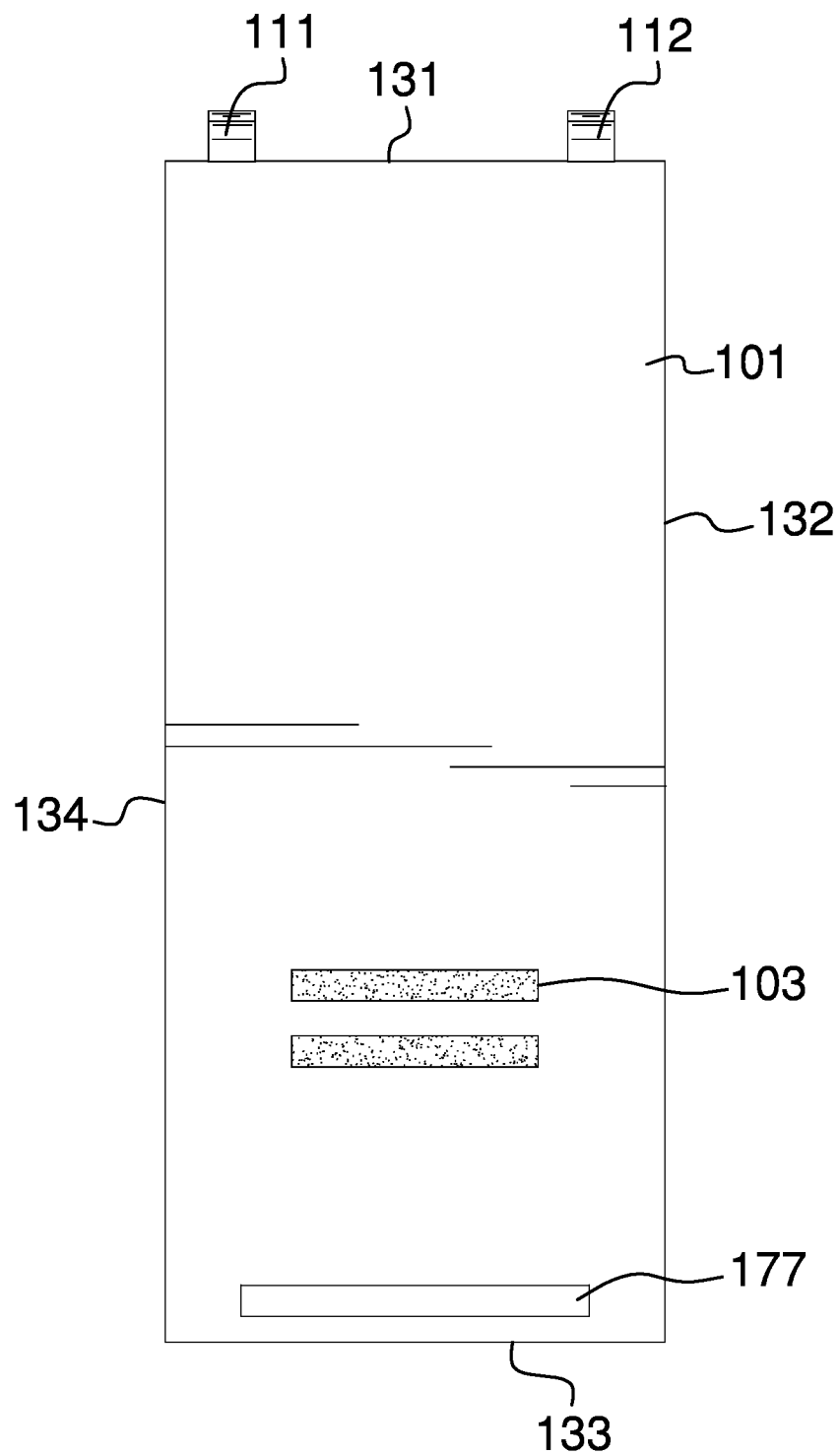
FIG. 3 is a top view of an embodiment of the disclosure.
Figure 4:
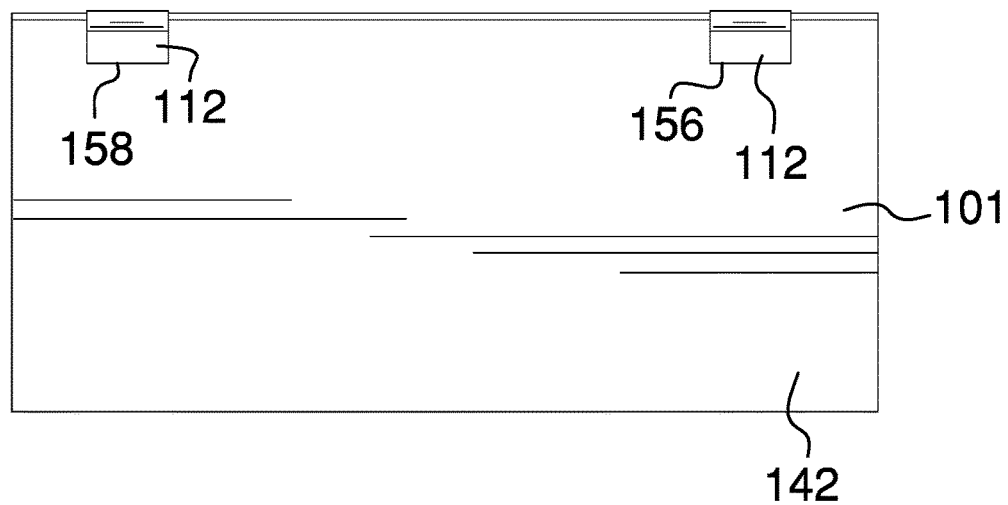
FIG. 4 is an end view of an embodiment of the disclosure.
Figure 5:
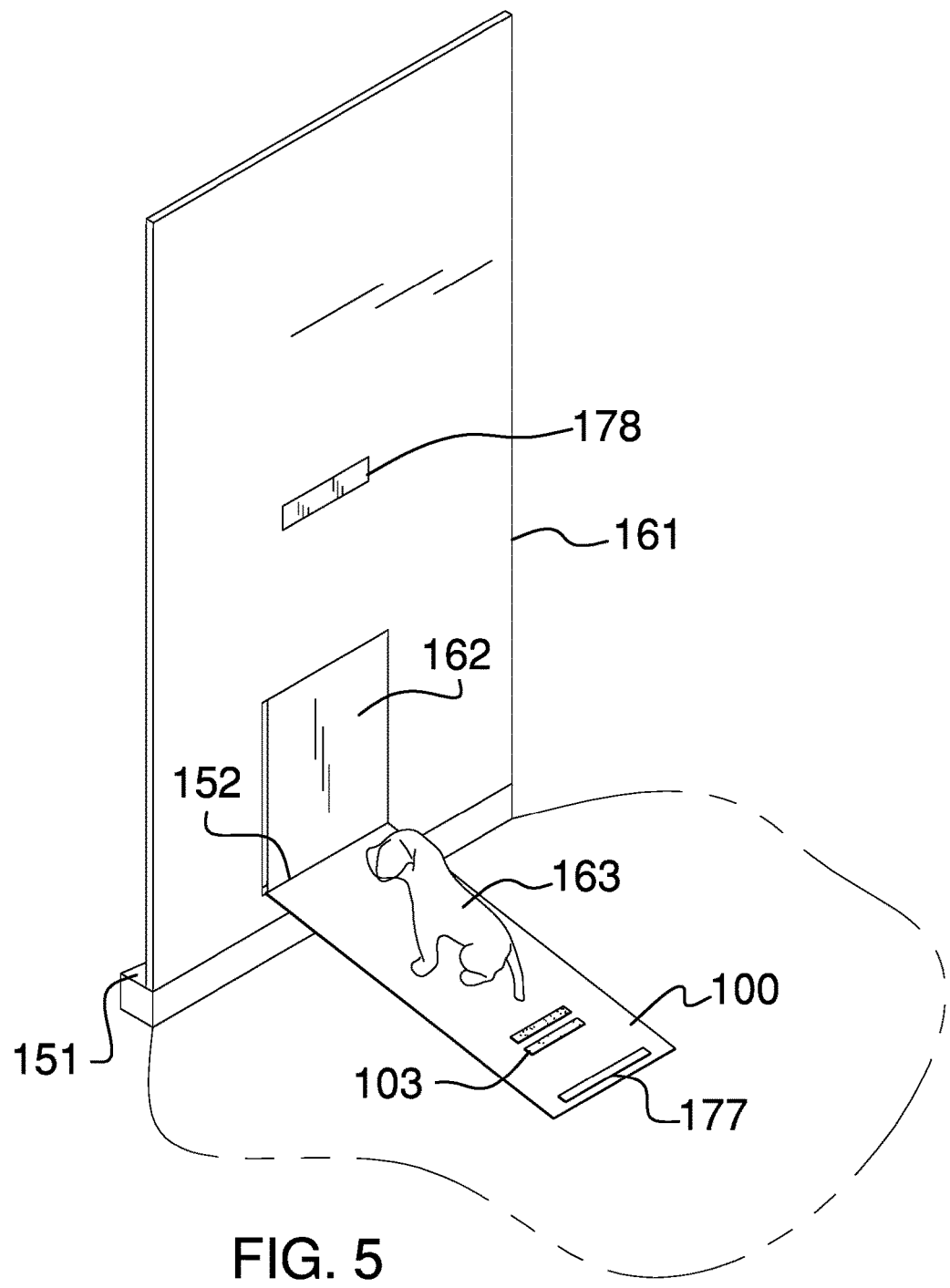
FIG. 5 is an in use view of an embodiment of the disclosure.
Figure 6:
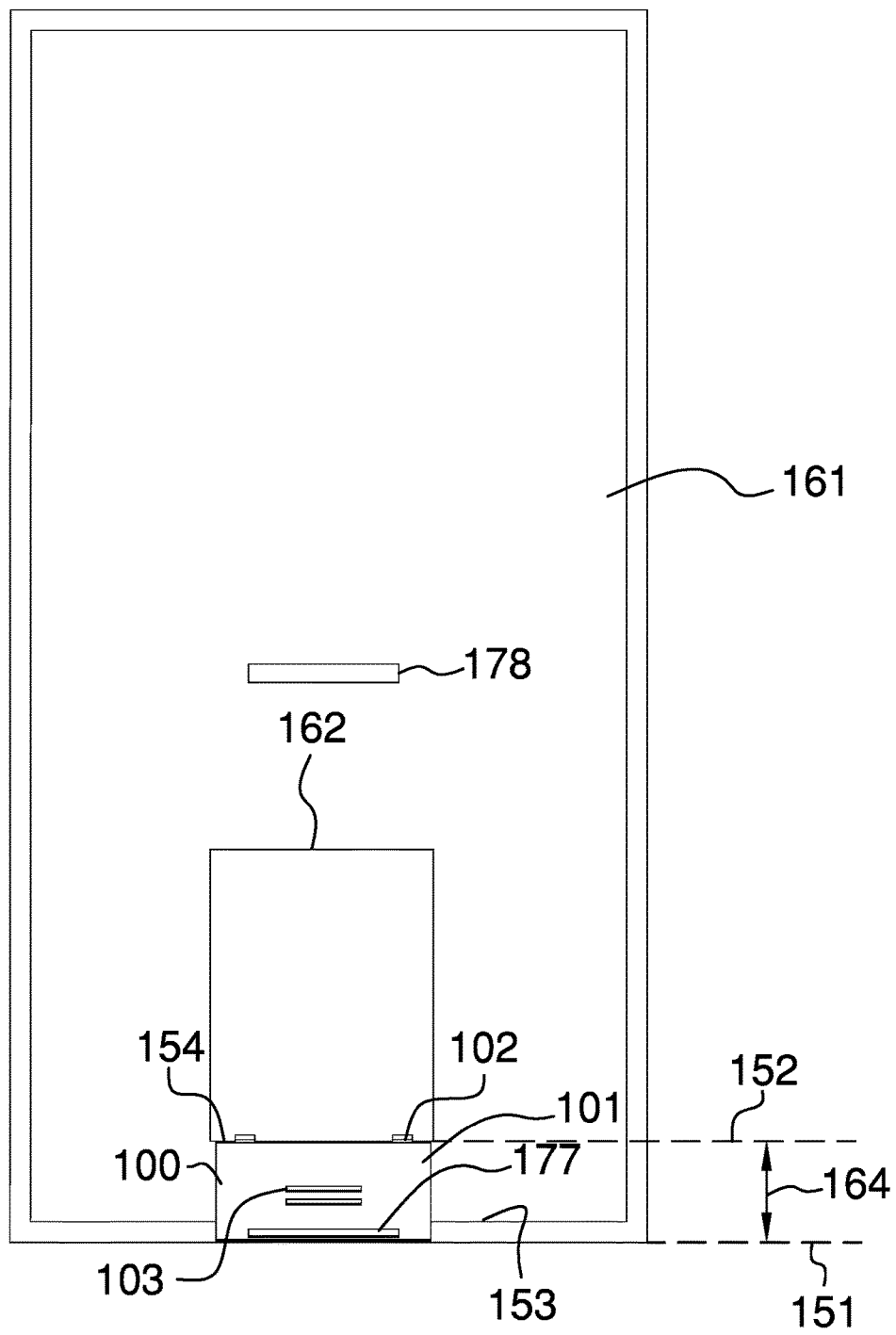
FIG. 6 is an in use view of an embodiment of the disclosure.

Detailed reference will now be made to one or more potential embodiments of the disclosure, which are illustrated in FIGS. 1 through 6.

The portable pet ramp 100 (hereinafter invention) is configured for use with a pet access door 162. The invention 100 is configured for use with the host door 161 associated with the pet access door 162. The invention 100 is an inclined structure that joins a first horizontal plane 151 upon which the first threshold 153 of the host door 161 rests with a second horizontal plane 152 that contains the second threshold 154 of the pet access door 162. In general, the first horizontal plane 151 will be a load-bearing surface while the second horizontal plane 152 is a hypothetical reference. The invention 100 attaches the second threshold 154 of the pet access door 162 to the first horizontal plane 151 that supports the first threshold 153 of the host door 161 such that a pet 163 may walk up the invention 100 to pass through the pet access door 162. The invention 100 is removably attached to the pet access door 162 such that the host door 161 may be further used for the ingress and egress of humans. The invention 100 comprises a plate 101, one or more brackets 102, and a slide stop 103. The one or more brackets 102 and the slide stop 103 attach to the plate 101.

The pet 163 is an animal that inhabits the residential building. The host door 161 is a door that forms an entrance into the residential building. The pet access door 162 is installed into the host door 161. The host door 161 is further defined with a first threshold 153. The first threshold 153 is further defined with a first horizontal plane 151. The pet access door 162 is an aperture that is formed within the host door 161 through which a pet 163 is trained to enter and exit the residential building. Pet access doors 162 are commercially available products that are well known by pet 163 owners. The pet access door 162 is further defined with a second threshold 154. The second threshold 154 is further defined with a second horizontal plane 152.

The first horizontal plane 151 is a horizontal surface upon which the host door 161 is placed. The first threshold 153 is proximal to the first horizontal plane 151. The second horizontal plane 152 is a hypothetical plane that is: 1) parallel to the first horizontal plane 151 and passes through the second threshold 154 of the pet access door 162. The first threshold 153 is the inferior edge of the host door 161. A pet 163 passing through the host door 161 will pass over the first threshold 153. The second threshold 154 is the inferior edge of the pet access door 162. A pet 163 passing through the pet access door 162 will pass over the second threshold 154.

The vertical span 164 is the span of distance between the first horizontal plane 151 and the second horizontal plane 152. Each of the one or more brackets 102 is a commercially available hardware item. The purpose of the each of the one or more brackets 102 is to hook the plate 101 to the second threshold 154 of the pet access door 162.

In the first potential embodiment of the disclosure, the one or more brackets 102 comprises a first L bracket 111 and a second L bracket 112. The first L bracket 111 is further defined with a first fixed end 155 and a first free end 156. The second L bracket 112 is further defined with a second fixed end 157 and a second free end 158. The first fixed end 155 is the end of the first L bracket 111 that is attached to the first surface 141 of the plate 101. The first free end 156 is the end of the first L bracket 111 that is distal from the first fixed end 155. The second fixed end 157 is the end of the second L bracket 112 that is attached to the first surface 141 of the plate 101. The second free end 158 is the end of the second L bracket 112 that is distal from the second fixed end 157.

The first L bracket 111 is a readily and commercially available hardware item. The first L bracket 111 is an L shaped brace that is attached to the plate 101 such that the plate 101 can be hung from the second threshold 154 of the pet access door 162.

The second L bracket 112 is a readily and commercially available hardware item. The second L bracket 112 is an L shaped brace that is attached to the plate 101 such that the plate 101 can be hung from the second threshold 154 of the pet access door 162.

The plate 101 is a rectangular block structure. One dimension of the rectangular block structure appears thin relative to the remaining two dimensions of the plate 101.

The plate 101 is further defined with a first surface 141 and a second surface 142. When the invention 100 is used normally, the superior surface of the plate 101 is the first surface 141 of the plate 101. The second surface 142 is the surface of the plate 101 that is distal from the first surface 141 of the plate 101.

The plate 101 is further defined with a first edge 131, a second edge 132, a third edge 133, and a fourth edge 134. The first edge 131 is the edge of the plate 101 that is proximal to the pet access door 162 during normal use of the invention 100. The second edge 132 connects the first edge 131 of the plate 101 to the third edge 133 of the plate 101. The third edge 133 is the edge of the plate 101 that is distal from the first edge 131 of the plate 101. The fourth edge 134 is the edge of the plate 101 that is distal from the second edge 132 of the plate 101.

The first edge 131 is the edge of the plate 101 that is proximal to the pet access door 162 during normal use of the invention 100. The first L bracket 111 and the second L bracket 112 are mounted on the first edge 131.

The first fixed end 155 of the first L bracket 111 is attached to the first surface 141 of the plate 101 such that the first L bracket 111 initially projects past the first edge 131 of the plate 101. The first L bracket 111 is formed with a hook angle 113 such that the first free end 156 of the first L bracket 111 projects away from the plane of the first surface 141 in the direction of the second surface 142. The first L bracket 111 attaches to the plate 101 using commercially available hardware.

The second fixed end 157 of the second L bracket 112 is attached to the first surface 141 of the plate 101 such that the second L bracket 112 initially projects past the first edge 131 of the plate 101. The second L bracket 112 is formed with a hook angle 113 such that the second free end 158 of the second L bracket 112 projects away from the plane of the first surface 141 in the direction of the second surface 142. The second L bracket 112 attaches to the plate 101 using commercially available hardware.

The slide stop 103 is a rectangular strip of material that is attached to the first surface 141 of the plate 101. The purpose of the slide stop 103 is to raise a portion of the first surface 141 of the plate 101 in order to: 1) provide the pet 163 a point of purchase when climbing on the plate 101; and, 2) to prevent the pet 163 from unintentionally sliding off the ramp that is formed by the plate 101. In the first potential embodiment of the disclosure, the slide stop 103 is mounted proximal and parallel to the third edge 133 of the plate 101. The slide stop 103 attaches to the first surface 141 of the plate 101 using commercially available hardware.

The invention 100 may further include a first secure member 177. The first secure member 177 is a magnetic strip that is provided on the plate 101 in order to interface with a second secure member 178. The second secure member 178 is provided on the host door 161 and aligns and corresponds with the first secure member 177 in order to support the plate 101 in a vertical position when not in use. The second secure member 178 is either made of a ferrous material or a magnetic material in order to form a magnetic attraction with the first secure member 177.

The following definitions were used in this disclosure:

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Inner Dimension: As used in this disclosure, the term inner dimension describes the span from a first inside or interior surface of a container to a second inside or interior surface of a container. The term is used in much the same way that a plumber would refer to the inner diameter of a pipe.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Superior: As used in this disclosure, the term superior refers to a directional reference that is parallel to and in the opposite direction of the force of gravity.

Threshold: As used in this disclosure, a threshold refers to a structure or edge that forms the inferior side of a doorway.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory for a specialty door comprising:
a plate, one or more brackets, and a slide stop;
wherein the one or more brackets and the slide stop attach to the plate;
wherein the accessory for a specialty door is configured for use with a pet access door;
wherein the accessory for a specialty door is configured for use with a host door associated with the pet access door;
wherein the accessory for a specialty door is an inclined structure;
wherein the accessory for a specialty door joins a first horizontal plane upon which the first threshold of the host door rests with a second horizontal plane that contains the second threshold of the pet access door;
wherein the accessory for a specialty door attaches the second threshold of the pet access door to the first horizontal plane that supports the first threshold of the host door such that a pet may walk up the accessory for a specialty door to pass through the pet access door;
wherein the accessory for a specialty door is removably attached to the pet access door;
wherein each of the one or more brackets hooks the plate to the second threshold of the pet access door;
wherein the one or more brackets comprises a first L bracket and a second L bracket;
wherein the first L bracket is further defined with a first fixed end and a first free end;
wherein the second L bracket is further defined with a second fixed end and a second free end;
wherein the first free end is the end of the first L bracket that is distal from the first fixed end;
wherein the second free end is the end of the second L bracket that is distal from the second fixed end;
wherein the first L bracket is a brace;
wherein the second L bracket is a brace;
wherein the first L bracket attaches to the plate such that the plate can be hung from the second threshold of the pet access door;
wherein the second L bracket attaches to the plate such that the plate can be hung from the second threshold of the pet access door.

2. The accessory for a specialty door according to claim 1
wherein the plate is a rectangular block structure;
wherein the plate is further defined with a first surface and a second surface;
wherein when the accessory for a specialty door is used normally the superior surface of the plate is the first surface of the plate;
wherein the second surface is the surface of the plate that is distal from the first surface of the plate;
wherein the plate is further defined with a first edge, a second edge, a third edge, and a fourth edge;
wherein the first edge is the edge of the plate that is proximal to the pet access door during normal use of the accessory for a specialty door;
wherein the second edge connects the first edge of the plate to the third edge of the plate;
wherein the third edge is the edge of the plate that is distal from the first edge of the plate;
wherein the fourth edge is the edge of the plate that is distal from the second edge of the plate.

3. The accessory for a specialty door according to claim wherein the first L bracket and the second L bracket are mounted on the first edge;
wherein the first fixed end of the first L bracket is attached to the first surface of the plate;
wherein the second fixed end of the second L bracket is attached to the first surface of the plate.

4. The accessory for a specialty door according to claim 3
wherein the first fixed end of the first L bracket projects past the first edge of the plate;
wherein the second fixed end of the second L bracket projects past the first edge of the plate.

5. The accessory for a specialty door according to claim 4
wherein the first L bracket is formed with a first hook angle;
wherein the second L bracket is formed with a second hook angle.

6. The accessory for a specialty door according to claim 5
wherein the first free end of the first L bracket projects away from the plane of the first surface in the direction of the second surface;
wherein the second free end of the second L bracket projects away from the plane of the first surface in the direction of the second surface.

7. The accessory for a specialty door according to claim 6 wherein the slide stop is a rectangular strip of material that is attached to the first surface of the plate.

8. The accessory for a specialty door according to claim 7 wherein the slide stop raises a portion of the first surface of the plate.

9. The accessory for a specialty door according to claim 7 wherein the slide stop is mounted parallel to the third edge of the plate.

10. The accessory for a specialty door according to claim 1
wherein the plate is a rectangular block structure;
wherein the plate is further defined with a first surface and a second surface;
wherein when the accessory for a specialty door is used normally the superior surface of the plate is the first surface of the plate;
wherein the second surface is the surface of the plate that is distal from the first surface of the plate;
wherein the plate is further defined with a first edge, a second edge, a third edge, and a fourth edge;
wherein the first edge is the edge of the plate that is proximal to the pet access door during normal use of the accessory for a specialty door;
wherein the second edge connects the first edge of the plate to the third edge of the plate;
wherein the third edge is the edge of the plate that is distal from the first edge of the plate;
wherein the fourth edge is the edge of the plate that is distal from the second edge of the plate.

11. The accessory for a specialty door according to claim 10
wherein the first L bracket and the second L bracket are mounted on the first edge;
wherein the first fixed end of the first L bracket is attached to the first surface of the plate;
wherein the second fixed end of the second L bracket is attached to the first surface of the plate;
wherein the first fixed end of the first L bracket projects past the first edge of the plate;
wherein the second fixed end of the second L bracket projects past the first edge of the plate;
wherein the first L bracket is formed with a first hook angle;
wherein the second L bracket is formed with a second hook angle;
wherein the first free end of the first L bracket projects away from the plane of the first surface in the direction of the second surface;
wherein the second free end of the second L bracket projects away from the plane of the first surface in the direction of the second surface.

12. The accessory for a specialty door according to claim 11 wherein the slide stop is a rectangular strip of material that is attached to the first surface of the plate.

13. The accessory for a specialty door according to claim 12 wherein the slide stop raises a portion of the first surface of the plate.

14. The accessory for a specialty door according to claim 13 wherein the slide stop is mounted parallel to the third edge of the plate.

15. The accessory for a specialty door according to claim 13 wherein the plate includes a first secure member; wherein the first secure member is a magnetic strip that is provided on the plate in order to interface with a second secure member; wherein the second secure member is provided on the host door and aligns and corresponds with the first secure member in order to support the plate in a vertical position when not in use.

* * * * *